May 10, 1932.   C. C. FUERST ET AL   1,857,502
BODY CONSTRUCTION FOR CAMERAS
Filed Oct. 14, 1930.
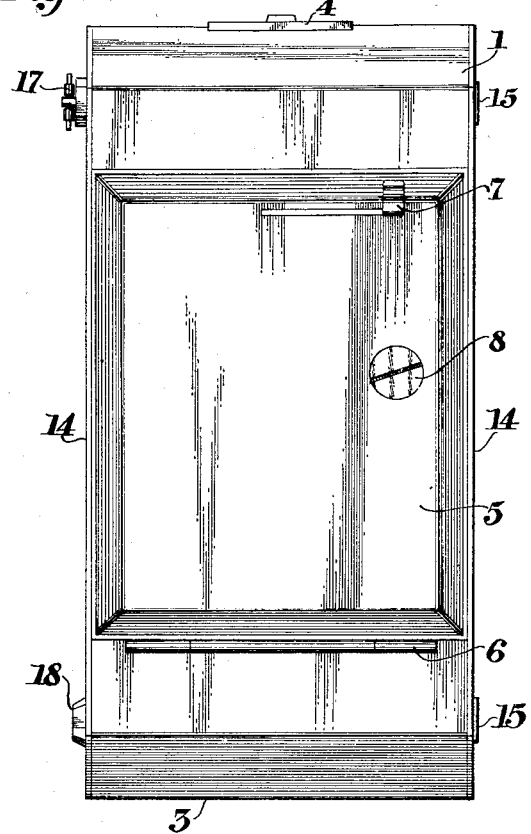
Fig.1.
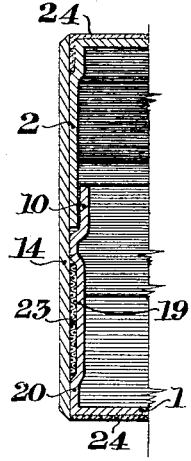
Fig.4.
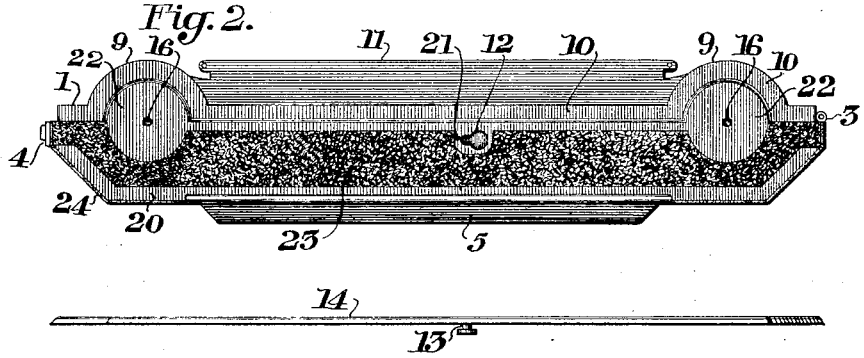
Fig.2.
Fig.3.
Inventors,
Carl C. Fuerst and John Christie,
By  Newton M. Perrins
George A. Gillette, Jr.
Attorneys Patented May 10, 1932

1,857,502

UNITED STATES PATENT OFFICE

CARL C. FUERST AND JOHN CHRISTIE, OF ROCHESTER, NEW YORK, ASSIGNORS TO EASTMAN KODAK COMPANY, OF ROCHESTER, NEW YORK, A CORPORATION OF NEW YORK

BODY CONSTRUCTION FOR CAMERAS

Application filed October 14, 1930. Serial No. 488,580.

This invention relates to camera body construction and more particularly to the formation of an effective light seal between that portion of the camera which is swung or removed from the body for loading of the film.

The principal object of this invention is a light sealing construction for a camera with a hinged or detachable portion. Other objects of the invention are the provision of a camera body construction embodying aforesaid light seal and withal readily manufactured and assembled.

The aforementioned objects are realized in a camera construction comprising a body composed of portions hinged to each other, depressions formed in each side of one portion, light sealing material in said depressions and a side plate attached to the same body portion by a bayonet lock and fastening means between the side plate and the said portion of the camera body to complete the light sealing construction.

Referring now to the accompanying drawings wherein like reference characters designate like parts and wherein:

Fig. 1 is a front elevation of a camera body according to the invention.

Fig. 2 is a side elevation of a camera body with the side plate and back portion removed.

Fig. 3 is a side elevation of a side plate.

Fig. 4 is a fragmentary transverse cross-section of the assembled camera construction.

In the illustrated embodiment of my invention, the body of the camera has a front body portion 1 and a rear or removable body portion 2 swingingly attached to each other by a hinge 3. A catch 4 fastens the free ends of said portions 1 and 2 to each other.

The front of the camera is constructed in the usual manner with a bed 5 attached to the front body portion 1 by a hinge 6, a pivotal catch 7 for the bed 5 and a plug 8 in a threaded recess for a tripod.

The front body portion 1 has integral semi-circular protrusions 9 along the side edges opposite the spools (not shown) and the side edges of said front body portion 1 including said semi-circular protrusions 9 have an offset rim 10 to form a light tight joint between the body portions 1 and 2, see Fig. 4. The bellows assembly 11 is mounted within said front body portion 1, see Fig. 2.

The camera construction thus far described is known and the following exposition will be devoted to a description of the improvements to this construction.

A bayonet slot 12 is provided in each side of the front body portion 1 and engages with the head of a pin 13 in corresponding position on side plate 14 to form a bayonet lock therefor. The side plate 14 is held in engaging position of the bayonet lock by means of side bolts 15 on one side passing through holes 16 in front body portion 1, and on the other side by winding key 17 and nut 18.

A depression 19 is formed in and extends the length of the side of front body portion 1, leaving a raised ridge 20 adjacent to the back of said front body portion 1, a raised surface 21 surrounding bayonet slot 12 and raised circular surfaces 22 around holes 16, as best shown in Fig. 2.

The depression 19 is filled with a suitable light sealing material 23, such as plush or other fabric, which is held in place by the side plates 14, or which may be cemented in place by a suitable adhesive substance and merely covered by side plate 14. In either event the joint between said plate 14 and the body portion 1 is rendered light proof. Also the joint between the front body portion 1 and rear body portion 2 is rendered secure from the leakage of light into the interior of the body, especially since the side edges of rear body portion 2 are in sliding surface contact on each side with offset rim 10 and side plate 14.

The outside surfaces of the body portions 1 and 2 are adapted to receive a suitable covering 24, such as leather, fabric, or enamel, while the side plates 14 are quite readily subjected to ornamentation processes before attachment to either body portion, and thus may serve as a decorative covering for the irregular joint between the relatively movable body portions.

Many modifications of the illustrated embodiments; such as changes in form of the body or body portions; changes in the form of the depressions; and changes in the attachment of the side plates 14 to the body or body portions to each other, are considered to be within the scope of the present invention and within the perview of the following claims.

Having now particularly described our invention, what we desire to protect by Letters Patent of the United States and what we claim is:

1. In a camera body construction, the combination with a front body portion, a removable body portion and a hinge connection therebetween, of a side plate attached to the side of one body portion and adapted to make surface contact with the side of the other body portion, whereby the camera body is provided with a light seal.

2. In a body construction for cameras, comprising the combination with a camera, a front body portion, a removable body portion and an offset rim along the edge of one of said body portions, of a side plate attached to the body portion having said offset rim whereby the camera body is provided with a double light seal.

3. In a body construction for cameras, in combination, a front body portion, a removable body portion, one of said portions being provided with an offset rim and depressions in the sides thereof, light sealing material in said depressions and a side plate attached to one of said body portions adjacent said light sealing material and the other body portion whereby the camera body is provided with an effective double light seal.

4. In a body construction for cameras, in combination, a front body portion, a removable body portion hinged thereto, said front body portion being provided with offset rims and depressions in the sides thereof, light sealing material in said depressions, and side plates attached to said front body portion adjacent said light sealing material in the sides of said removable body portion.

5. A body construction for cameras comprising a front body portion, a removable body portion, side plates attached to one of said body portions, a bayonet lock therebetween and fastening means between said plates and said body portion for positioning said plates with respect thereto whereby the side plates are securely and demountably attached to one body portion.

6. In a body construction for cameras, comprising the combination with, a body portion and a removable body portion, of side plates attached to one of said body portions, a headed pin on each of said side plates, each side of said body portion being provided with a bayonet slot opposite said pins and fastening means maintaining said side plates in position with said headed pins engaging said bayonet slot.

7. A body construction for cameras, comprising a front body portion, a removable body portion, the sides of said front body portion being provided with an offset rim, a depression and a bayonet slot, light sealing material in each of said depressions, side plates attached to each side of said front body portion, a headed pin on each of said side plates opposite said bayonet slots in said front body portion, and threaded fastening means between said side plates and said front body portion.

8. A body construction for cameras comprising a front body portion, a relatively movable body portion, interengaging parts in the two portions, and an external side plate attached to one body portion and adapted to cover the interengaging parts of both body portions when said interengaging parts are moved into operative relation.

9. A body construction for cameras comprising a front body portion, a relatively movable body portion, interengaging parts in the two portions of irregular shape and adapted to form a joint between the body portions and a side plate adapted to obscure the joint between the relatively movable body portions to form a decorative covering therefor.

Signed at Rochester, N. Y., this 8th day of October, 1930.

CARL C. FUERST.
JOHN CHRISTIE.